United States Patent [19]

Cook, Jr. et al.

[11] 4,100,050

[45] Jul. 11, 1978

[54] COATING METAL ANODES TO DECREASE CONSUMPTION RATES

[75] Inventors: Edward H. Cook, Jr., Lewiston; Gerald R. Marks, Youngstown, both of N.Y.

[73] Assignee: Hooker Chemicals & Plastics Corp., Niagara Falls, N.Y.

[21] Appl. No.: 420,242

[22] Filed: Nov. 29, 1973

[51] Int. Cl.² .......................... C25B 1/16; C25B 1/26; C25B 9/00

[52] U.S. Cl. .................................... 204/252; 204/98; 204/266; 204/290 F; 204/296

[58] Field of Search ................. 204/98, 252, 266, 283, 204/290 F, 296

[56] References Cited

U.S. PATENT DOCUMENTS

| B 361,744 | 1/1975 | Gritzner | 204/266 X |
| 1,771,091 | 7/1930 | Lawaczeck | 204/252 |
| 3,117,034 | 1/1964 | Tirrell | 204/265 X |
| 3,220,941 | 11/1965 | Osborne | 204/226 X |
| 3,257,334 | 6/1966 | Chen et al. | 204/296 X |
| 3,282,875 | 11/1966 | Connolly et al. | 204/296 |
| 3,607,687 | 9/1971 | Grangaard | 204/265 X |
| 3,668,005 | 6/1972 | Sluse | 204/290 F X |
| 3,755,108 | 8/1973 | Raetzsch et al. | 204/256 X |
| 3,763,005 | 10/1973 | Butre et al. | 204/257 X |
| 3,773,634 | 11/1973 | Stacey et al. | 204/98 |

FOREIGN PATENT DOCUMENTS

| 849,670 | 8/1970 | Canada. |
| 910,847 | 9/1972 | Canada | 204/290 F |

OTHER PUBLICATIONS

"XR Perfluorosulfonic Acid Membranes", New Product Information from R & D Division–Plastics Dept. (DuPont), 10/1/69.

*Primary Examiner*—Arthur C. Prescott
*Attorney, Agent, or Firm*—Peter F. Casella; Herbert W. Mylius

[57] ABSTRACT

An improved anode structure for a chlor-alkali type diaphragm cell wherein the anode is a porous, valve metal, e.g., titanium, anode having on one side a coating of a noble metal or noble metal oxide and on the uncoated side a membrane composed essentially of a cation-active permselective material which is substantially impervious to liquids and gases. The membrane covered surface is disposed spaced from but facing the cathode member.

Anodes of this improved structure give minimum cell voltage and a surprisingly reduced consumption rate of the noble metal or oxide coating.

17 Claims, 2 Drawing Figures

4,100,050

COATING METAL ANODES TO DECREASE CONSUMPTION RATES

FIELD OF INVENTION

This invention relates to membrane type electrolytic cells for the electrolysis of aqueous solutions and more particularly to the anode structure of such cells particularly suited for the electrolysis of aqueous alkali metal halide containing solutions.

BACKGROUND OF THE INVENTION

The electrolysis of aqueous solutions of ionizable chemical compounds such as alkali metal halide brine solutions, alkali metal phosphate solutions, hydrothalic acid solutions, and the like, in a cell equipped with an anode and a cathode separated by a porous diaphragm is well known in this art. In most instances, such cells are operated under conditions such that ionic migration and molecular migration through the porous diaphragm occurs to a substantial degree resulting in the contamination of the cathode liquor with undecomposed electrolyte and of the anode liquor with reaction products of the cathodic and anodic materials. Recent developments in electrochemical decomposition cells has lead to the replacement of the porous diaphragm member with cation active permselective membranes which substantially prevent undesirable molecular migration.

Thus in U.S. application of E. H. Cook, Jr. et al. Ser. No. 212,171, filed Dec. 27, 1971 now abandoned there is disclosed an improved method and apparatus for the electrolysis of aqueous solutions of ionizable compounds, e.g., sodium chloride, wherein the anode and cathode members are separated by a cation-active permselective membrane consisting essentially of a hydrolyzed co-polymer of tetrafluoroethylene and a sulfonated perfluorovinyl ether having the formula

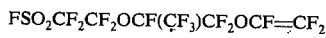

$$FSO_2CF_2CF_2OCF(CF_3)CF_2OCF{=}CF_2$$

said copolymer having an equivalent weight of from about 900 to about 1600. Such membranes being substantially impervious to both liquids and gases, enable the production of very pure anodic and cathodic products. However it was noted that the gases formed at the anode surfaces often become entrapped between the anode and the diaphragm leading to an uneven passage of current from the anode to the cathodes.

This problem of the entrapment of gases formed at the anode has been solved at least to a major extent by the placement of the membrane on the surface of the anode facing the cathode. In copending application of E. H. Cook et al. Ser. No. 416,916 filed Nov. 19, 1973, now abandoned, methods for the emplacement of cation active permselective impervious membranes on the inner surface of porous anode members are disclosed. Thus by restricting the evolution of gases to the back face or uncovered side of the porous anode the problems of increased cell voltages due to the entrapment of such gases between the anode and membrane have been largely prevented.

In such cells wherein the anodes are constructed of valve metals such as titanium, zirconium, tantalum, niobium or an alloy thereof the surface of which is coated with an electrically conductive coating of a noble metal, such as platinum, iridium, palladium, ruthenium, osmium, rhodium, ruthenium or an alloy or oxide thereof, it was found that the proximity of the noble metal coating to the highly alkaline catholyte liquor lead to increased rate of consumption of the noble metal.

It has been disclosed, in Canadian Pat. No. 910,847, that titanium or the like valve metals can be used to construct electrodes serving a dual function of anode and diaphragm. In such components of electrolysis cells, a porous titanium base material is coated on one gas impermeable surface thereof with noble metal or oxide thereof and on the other gas impermeable surface, facing the cathode member, with an electrically non-conductive material, e.g., titanium dioxide or organic plastic material. Such an anode/diaphragm construction is permeable to liquids and gases and hardly, in the conventional sense includes a diaphragm member, much less a cation-active permselective barrier.

In British Pat. No. 1,313,441 a process for preparing chlorine and hydrogen is disclosed wherein an electrolysis cell having a cationic selectively permeable membrane is provided to separate a porous coated valve metal anode and a cathode and wherein only the surfaces of the anode which do not face the membrane are electrically active, i.e., only such surfaces are coated with a noble metal or oxide thereof. In this disclosure the permeable membrane is positioned apart from the porous anode, and molecular migration is not prevented. Further gas accumulation on the surfaces of the anode is said to be prevented by the forced circulation of the anolyte liquor.

OBJECTS OF THE INVENTION

It is a primary object of this invention to provide a novel electrolysis apparatus which overcomes the difficulties inherent in the prior art apparatus and thus to overcome the difficulties encountered in segregating the desirable products during the electrolysis without loss of the many advantages inherently connected therewith.

Another object is to provide an electrolysis apparatus which is operative at a constant low cell voltage.

A particular object is to provide an improved coated anode structure which is operative at a low coating consumption rate.

These and other objects will be obvious from the following description of the invention.

BRIEF SUMMARY OF THE INVENTION

In accordance with the invention, there is provided an electrolytic membrane type cell comprising a housing divided into at least one anode compartment containing an anode and at least one cathode compartment containing a cathode, said compartments being separated by a cation active permselective membrane which is substantially impervious to liquids and gases, said membrane being placed on one face of said anode apart from, but facing the cathode, said anode being porous to liquids and gases and comprising a valve metal, such as titanium, tantalum, zirconium, niobium or an alloy thereof, the back face of the porous anode, i.e. the face which is not covered by the membrane, being coated with a noble metal, noble metal alloy or noble metal oxide.

DETAILED DESCRIPTION OF THE INVENTION

Figure 1:
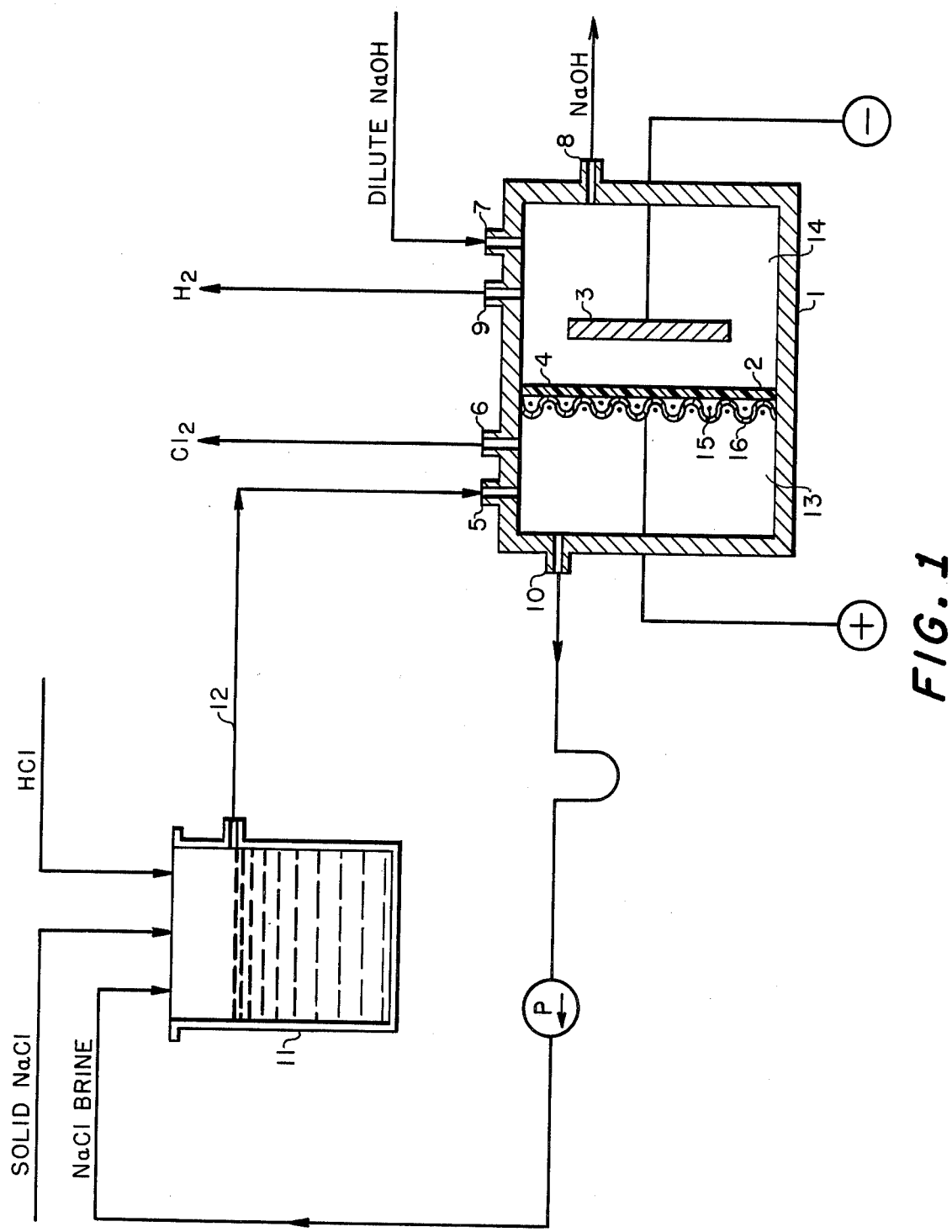

In order that the invention may be more readily understood, it will be described with specific reference to certain preferred embodiments, and specifically with reference to the apparatus suitable for the electrolysis of aqueous solutions of sodium chloride whereby substantially hydrogen free chlorine, substantially chlorine free hydrogen, free and substantially sodium chloride free caustic soda are produced. It is not, however to be construed as limited thereto except as defined in the appended claims, since this apparatus as such or by a minimum of variations can also be used for the electrolysis of aqueous solutions ionizable compounds. Exemplary of such aqueous solutions and the products produced include but are not limited to aqueous solutions of alkali metal halides to produce alkali metal hydroxide and halogen; aqueous solutions of hydrogen chloride to produce hydrogen and chlorine; aqueous solutions of ammonium sulfate to produce persulfates; aqueous solutions of borax to produce perborates, and the like. Of these the most preferred anolyte solutions are of alkali metal halides, particularly sodium chloride and of hydrochloric acid, as well as mixtures thereof.

In the drawings which are attached hereto and form a part of this disclosure

Figure 2:
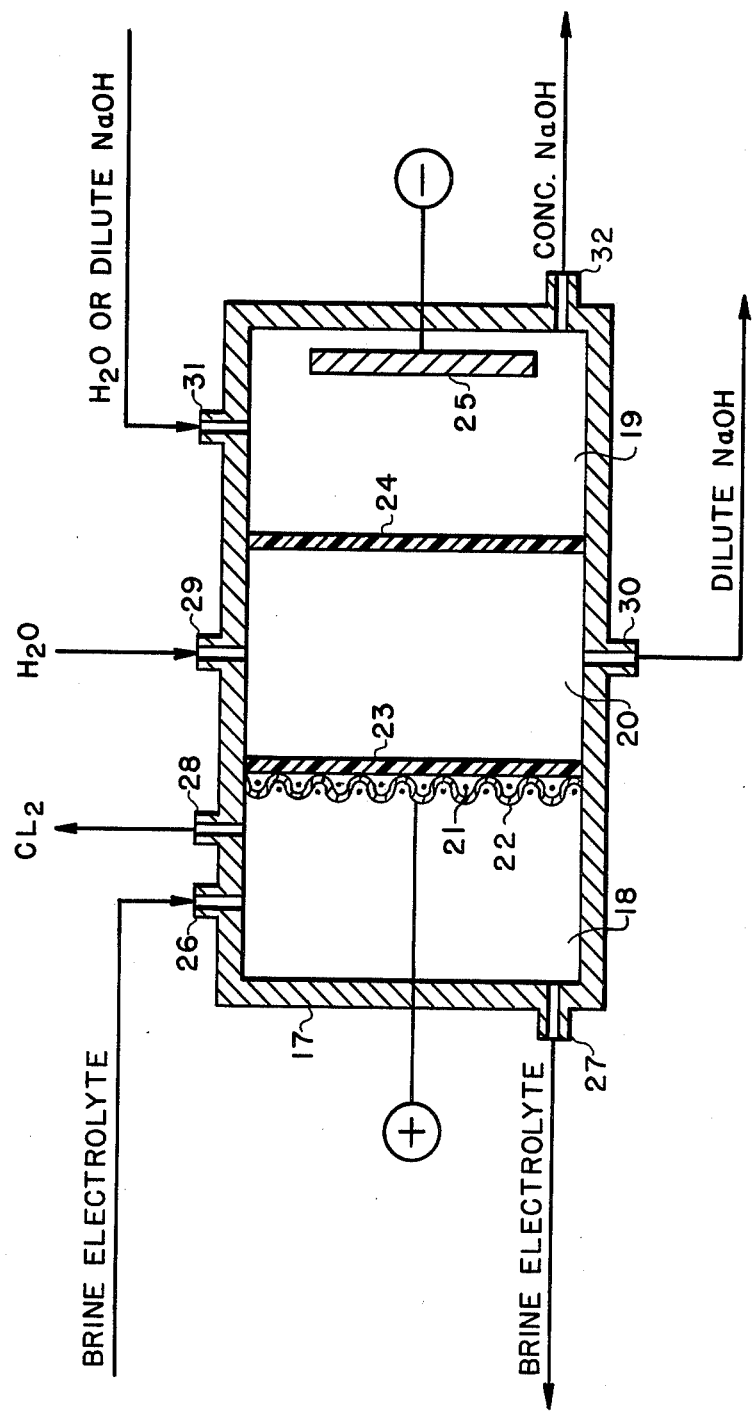

FIG. 1 is a schematic view of a two compartment electrolysis cell constituting one embodiment of the present invention, and FIG. 2 is a schematic view of a three compartment electrolysis cell constituting an alternate embodiment of the present invention.

The invention will be more fully described by reference to the attached FIG. 1 which shows a schematic view of the electrolysis cell, 1, which comprises an anode, 2, and a cathode, 3, separated by a cation-active permselective membrane, 4 which is positioned on the face of anode, 2, facing the cathode, 3, and forming an anolyte compartment, 13, and a catholyte compartment, 14. The anode consists essentially of a porous section, 15, coated on the back face, i.e., the face remote from the cathode, with a conductive coating, 16 of a noble metal, nobel metal alloy, or oxide thereof. Thereby the combination of the membrane, 4, porous anode section, 15, and noble metal or oxide coating 16, forms a unitary element. The cell, 1, has an inlet, 5, in the anode compartment, 13, for the electrolyte, an outlet 10, for spent electrolyte, and an outlet, 6, for gaseous product e.g., chlorine, formed at the coated surface or face, 16, of the anode. There is also provided an inlet, 7, for charging liquid such as water or dilute aqueous caustic soda, to the cathode compartment, an outlet, 8, for discharging concentrated cathode liquor, such as concentrated caustic soda, from the cathode compartment and an outlet, 9, for hydrogen gas.

Saturated electrolyte, e.g., brine, is continuously circulated in the anolyte compartment, by introducing the solution through inlet, 15, and withdrawing the spent electrolyte through outlet, 10, and directing it to replenishing zone, 11, wherein the depleted solution is resaturated with e.g., sodium chloride and acidified with acid if desired. The replenished electrolyte flows, via line 12, to reenter cell, 1, at inlet 5.

Referring now to FIG. 2, which is a schematic representation of a three compartment cell incorporating the improvements of the present invention, the cell body, 17, is formed into an anode compartment, 18, a cathode compartment, 19, and a buffer compartment, 20. Forming the buffer compartment, 20, and separating it from the anode compartment, 18, and cathode compartment, 19, are membranes, 23, and 24, respectively which membranes are formed of a cation-active permselective membrane which is impervious to liquids and gases. A porous anode, 21, having a coating, 22, on the back surface only, that is the face of the anode remote from the cathode compartment, is positioned on the membrane 23, forming the wall separating the anode compartment from the buffer compartment. The cathode compartment, 19, contains disposed therein a cathode, 25.

The anode compartment, 18, is provided with an inlet, 26, through which the electrolyte, such as sodium chloride brine, is introduced. An outlet, 27, is also provided in the anode compartment through which outlet the depleted electrolyte is discharged from the anode compartment. Additionally, the anode compartment is provided with a gas outlet, 28, through which the gaseous decomposition product, such as chlorine, is removed from the anode compartment.

The buffer compartment, 20, is provided with an inlet, 29, and an outlet, 30. When the electrolysis cell is utilized for the electrolysis of a sodium chloride brine, to produce chlorine and caustic soda, water will be introduced into the buffer compartment through inlet, 29, and dilute caustic soda may, if desired, be withdrawn through outlet, 30. The cathode compartment contains an inlet, 31, and an outlet, 32, through which respectively, in the preferred electrolysis of sodium chloride brine, water or dilute aqueous caustic soda is introduced and a concentrated aqueous caustic soda, of high purity, is recovered as a product of the process. Additionally the cathode compartment may also contain an outlet (not shown) for the gaseous by-products formed at the cathode, such as hydrogen.

Although the inlets and outlets in the several compartments are shown as being located in the upper and lower portions of the compartments, other arrangements for these means can be utilized if desired.

The unitary structure of the porous anode and membrane wherein the anode is coated on the back face only functions to limit the formation of gaseous products on this coated surface. Electrolysis does not occur on the uncoated surface. Gas bubbles are rapidly released from the back face of the anode and travel upwardly to the gas outlet. No gas is formed on the front uncoated surface of the porous anode and is prevented from collecting between the anode and membrane by the placement of the latter on the front face of the former. Accordingly voltage increases, due to such entrapped gas, do not occur. Moreover by positioning the noble metal coating on the back face of the porous anode section, relatively remote from the highly alkaline catholyte i.e., remote from or outside of the diffusion layer of caustic liquor at the membrane surface, the coating consumption is reduced to and maintained at a surprisingly low rate.

The membrane may be positioned, placed or secured to the front, or uncoated, face of the anode in any convenient manner. Thus the membrane may be placed on the front face by clamping means, by bolting, by adhesive means or combinations of such means and the like. As indicated above, methods for the emplacement of cation-active permselective impervious membranes on the front face or inner surface of a porous anode member are disclosed in co-pending application of E. H. Cook et al. Ser. No. 416,916 filed Nov. 19, 1973.

In a preferred embodiment of the process of this invention, sodium chloride brine solutions containing from about 200 grams per liter ("gpl") to about 320 gpl are electrolyzed in cells of the above design containing a titanium mesh anode coated on the back, face or side with a ruthenium oxide coating and having on the uncoated front face a cation active permselective membrane of a hydrolyzed copolymer of tetrafluoroethylene and a fluoro sulfonated perfluorovinyl ether of equivalent weight of from about 900 to about 1600, prepared as described in U.S. Pat. No. 3,282,875 and a steel cathode, by impressing a decomposition voltage across the electrodes. The alkali metal hydroxide content in the cathode compartment is maintained above about 10% by weight, and preferably from about 24 to about 33 percent by weight, and an alkali metal hydroxide product is recovered from said cathode compartment containing less than about one percent by weight of sodium chloride and substantially hydrogen free chlorine is recovered from the anolyte compartment.

The porous anode section may be formed of perforated material, mesh, netting, gridiron, screen, spaced rods and the like. Anodes of valve metals such as titanium, tantalum, zirconium, niobium or alloys thereof, either per se or steel or aluminum bases covered with such valve metals are known. Such structures when coated with noble metals, or alloys or oxides of noble metals such as platinum, iridium, palladium, ruthenium, osmium or rhodium are rendered electrically active, and are known in this art as dimensionally stable metal structures. For use in this invention, only one surface or face of the porous valve metal structure is coated with said noble metal coating.

The preferred anode structure is that formed from diamond shaped mesh. The mesh can be flattened or unflattened with the latter being especially preferred.

The cathodes used in this apparatus of this invention are the conventionally used ferrous metal cathodes. They may be solid or porous. Preferably a steel mesh cathode is used.

The presently preferred cation active permselective membrane material is of a hydrolyzed copolymer of a perfluorinated hydrocarbon and a fluorosulfonated perfluorovinyl ether. The perfluorinated hydrocarbon is preferably tetrafluoroethylene although other perfluorinated saturated and unsaturated hydrocarbons of from 2 to 5 carbon atoms can also be utilized, of which the monoolefinic hydrocarbons are preferred, especially those of 2 to 4 carbon atoms and most especially those of 2 to 3 carbon atoms, e.g., tetrafluoroethylene, and hexafluoropropylene. The sulfonated perfluorovinyl ether which is most useful is that of the formula

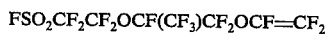

$FSO_2CF_2CF_2OCF(CF_3)CF_2OCF=CF_2$

This material, named as perfluoro[2-(2-fluorosulfonylethoxy)-propyl] vinyl ether, may be modified to equivalent monomers, as by modifying the internal perfluorosulfonylethoxy moiety to the corresponding propoxy moiety, and by altering the propyl group to ethyl or butyl group, and by rearranging the positions of substitution of the sulfonyl group thereon and by utilizing modifications of the perfluoro lower alkyl groups, respectively.

The method of manufacture of the fluorosulfonyl copolymer is described in Example XVII of the above referred to U.S. Pat. No. 3,282,875 and an alternate method is disclosed in Canadian Pat. No. 849,670, which also discloses the use of these and analogous membranes in fuel cells, characterized therein as electrochemical cells. The disclosures of such patents are hereby incorporated herein by reference. In short, the copolymer can be made by reacting fluorosulfonated perfluorovinyl ether or the equivalent with tetrafluoroethylene or equivalent in the desired proportions in water at elevated temperatures and pressures for over an hour after which time the reaction mass is cooled. The mixture separates into a lower perfluoroether layer and an upper layer of an aqueous dispersion of the desired polymer. The molecular weight of the latter is indeterminate but the equivalent weight is from about 900 to about 1600, preferably from about 1100 to about 1400, and the percentage of the fluorosulfonated perfluorovinyl ether or corresponding compound is about 10 to 30 percent by weight, preferably about 15 to 20 percent by weight and most preferably about 17 percent by weight. The unhydrolyzed copolymer may be compression molded at high temperatures and pressures to produce sheets or membranes which vary in thickness from about 0.002 to 0.5 mm. These then may be further treated to hydrolyze the pendant $-SO_2F$ to $-SO_3H$ groups as by boiling in water or in 10 percent aqueous sulfuric acid or by the methods of the patents previously mentioned. The presence of the $-SO_3H$ groups may be verified by titration with standard base as described in the Canadian patent previously mentioned. Additional details of various processing steps are described in Canadian Pat. No. 752,427 and U.S. Pat. No. 3,041,317, also hereby incorporated by reference.

Because it has been found that some expansion or swelling accompanies the hydrolysis of the copolymer, it is advantageous to position the copolymer membrane into a frame or other support means to hold it in place on the surface of the electrode in the electrochemical cell. Thereafter it may be clamped or cemented in place on the electrode and will be true without sags or gaps. The membrane material is preferably joined to a backing material, e.g., tetrafluoroethylene or other suitable filamentary material prior to hydrolysis when the copolymer is still thermoplastic and the film of copolymer covers each filament penetrating into the spaces or interstices of the backing material between them and even around behind them, thinning the films slightly in the process where it covers the filaments.

The cation-active permselective membrane material described above is far superior when assembled in an electrochemical cell as described herein to previously suggested materials. The new material is more stable at elevated temperatures, e.g., above 75° C. It lasts for much longer periods in the medium of the electrolyte and does not become brittle when exposed to chlorine at high cell temperatures. Moreover when assembled on the face of the electrode elements of the cell as described herein, the permissable gap between the electrodes can be substantially reduced and maintained constant resulting in increased power efficiency. Considering the savings in time, maintainance, and fabrication costs, these membranes are more economical. The voltage drop through the membranes is acceptable, does not vary due to the formation of gaps and sagging and does not become inordinately high as it does with many other membrane materials, when the caustic concentration in the cathode compartment increases to above about 200 gpl. The selectivity of the membrane and its compatability with the electrolyte does not decrease as the hydroxyl concentration of the catholyte liquor increases, as has been noted with other membrane materials, nor does the caustic efficiency of the electrolysis diminish as significantly as it does with other membranes as the electrolysis proceeds. Thus these improvements in the present membranes and the manner of emplacement thereof in the cell make it more practicable whereas previously disclosed ion-exchange membrane materials have not attained commercial acceptance. While the more preferred copolymers are those having equivalent weights of from about 900 to about 1600, with about 1100 to about 1400 being especially preferred, some useful resinous membranes of this same genere have equivalent weights within the range of about 500 to 4000. The intermediate equivalent weight copolymers are preferred because they are of satisfactory strength, stability, permselectivity, enable better selective ion exchange to take place and are of lower internal resistance, all of which are important in the electrochemical art.

Improved versions of the above-described copolymers may be made by chemical treatment of the surfaces thereof, as by treatments to modify the $-SO_3H$ groups thereon. For example, the sulfonic acid groups may be altered or replaced in whole or in party with other moieties. Such changes may be made in the copolymer manufacturing process or after production of the membrane. When effected as a subsequent treatment of the membrane, the depth of the treatment will usually be from 0.001 to 0.01 mm. Caustic efficiencies of the improved processes using such modified versions of the present improved membranes can increase about 3 to about 20% or more, most often from about 5 to 15%.

One such modification is described in French Pat. No. 2,152,194. This patent discloses membranes consisting essentially of a film of a fluorinated polymer having pendant side chains containing sulfonyl groups attached to carbon atoms having at least one fluorine atom, the majority of the sulfonyl groups on one surface of the film being in the form of $-(SO_2NH_2)_mQ$ groups where Q is H, $NH_4$, alkali or alkaline earth metal and $m$ is the valence of Q and the sulfonyl groups on the other surface of the film being in the form of $-(SO_3)_nMe$ groups where Me is a cation and $n$ is the valence of Me with the proviso that when Me is H, Q is H.

In addition to the copolymers discussed above, including modifications thereof, it has been found that another membrane material is also superior to prior art films for applications in electrochemical cells. Although it appears that tetrafluoroethylene polymers which are sequentially styrenated and sulfonated are not useful for making satisfactory cation-active permselective membranes acceptable for use in electrochemical processes, it has been found that perfluorinated ethylene propylene polymer which has been styrenated and sulfonated does make a useful cation-active permselective membrane material. Whereas useful lives of as much as three years or more (that of the preferred copolymer material) may not be obtained with this alternate material, it is surprisingly resistant to hardening under normal use conditions.

To manufacture the sulfostyrenated perfluorinated ethylene propylene polymers, a commercially available perfluoroethylene propylene polymer is styrenated and then the styrenated product is sulfonated. A solution of styrene in methylene chloride, benzene, or analogous solvent at a suitable concentration in the range of about 10 to about 20 percent by weight is prepared and a sheet of the polymer having a thickness of about 0.02 to 0.5 mm, preferably 0.05 to 0.15 mm, is immersed in the solution. After removal, the sheet is subjected to a radiation treatment, using a cobalt 60 radiation source. The rate of application may be in the range of about 8000 rads/hr. and a total radiation application should be about 0.9 megerads. After rinsing the irradiated sheet with water, the phenyl nuclei of the styrene portion of the polymer are monosulfonated, preferably in the para position, by treatment with chlorosulfonic acid, fuming sulfuric acid (oleum) or sulfur trioxide. Preferably chlorosulfonic acid in chloroform is used and the sulfonation may be completed in about ½ hour at ambient temperature.

Examples of such useful membranes made by the above described process are products of RAI Research Corporation, Hauppauge, N.Y. and are identified as 18 ST12S and 16ST13S, the former being 18% styrenated and having about ⅔ of the phenyl nuclei monosulfonated and the latter being 16% styrenated and having 13/16 of the phenyl nuclei monosulfonated. To obtain 18% styrenation a solution of 17½% styrene in methylene chloride is utilized and to obtain a 16% styrenation, a 16% styrene solution in methylene chloride is employed.

The products resulting from this process compare favorably with the preferred copolymers previously described giving voltage drops of about 0.2 volt each in a typical electrochemical cell at a current density of 2 amperes/sq. in. about the same as is obtained with the preferred copolymer.

The following examples will illustrate the present invention. Parts and percentages are by weight and temperatures are given in degrees centigrade unless otherwise specified.

EXAMPLE 1

A saturated solution of sodium chloride was continuously introduced into the anode compartment of a two compartment electrolysis cell as illustrated in the drawing attached. The anode member was a titanium anode of flat diamond mesh coated on the back face only with ruthenium oxide. The front face of the anode was covered with a cation-active permselective membrane of 2.14 sq. in. effective area composed of a hydrolyzed copolymer of tetrafluoroethylene and fluorosulfonated perfluorovinyl ether of equivalent weight of about 1100, prepared according to U.S. Pat. No. 3,282,875. The membrane had been conditioned to the free acid form by soaking in boiling water prior to emplacement upon the uncoated surface of the porous titanium mesh anode.

The brine was circulated continuously within the anode compartment through a conduit in communication with the brine inlet and outlet. The cathode compartment was initially filled with dilute aqueous sodium hydroxide containing 50 gpl NaOH. An over flow pipe for removal of concentrated caustic soda liquor was located in the cathode compartment, and the level of catholyte was maintained by the continuous addition of water to the cathode compartment. Chlorine gas discharged at the anode was taken off from the anode compartment through the gas vent pipe provided therein and hydrogen discharged at the cathode was similarly vented from the cathode compartment. A cell temperature of about 90° was maintained in the cell which was operated at a current density of two amperes per square inch of diaphragm. The cell was operated continuously under these conditions for four months.

For comparison a similarly constructed cell but containing a titanium mesh anode having a ruthenium oxide coating over all surfaces of the titanium was operated for a similar period under substantially the same conditions.

The coating consumption rate of the ruthenium oxide coating in the cell containing the coating on the back face only was 0.22 gram of ruthenium per ton of chlorine produced. In the comparison cell containing the coating on both faces of the titanium mesh the consumption rate of ruthenium was found to be 2.0 grams of ruthenium per ton of chlorine produced.

When an anode constructed of unflattened diamond shape titanium mesh and coated on the back face only, was used under similar operating conditions, the voltage increase was substantially that observed in the comparison cell.

EXAMPLE 2

In this experiment two, two-compartment, electrolysis cells substantially identical in design were operated in series. The anodes were constructed of flattened diamond shape titanium mesh having an area of 60 square inches. The current density was two amperes per square inch. Cation-active permselective membranes as described in Example 1 above were placed on the front face of each of the anodes. The cells were operated to produce caustic soda liquor in the cathode compartments of between about 110 and about 130 gpl NaOH. The operating details were as described in Example 1 above.

The anodes used differed in that in one cell the front face only was coated with a ruthenium oxide coating whereas the back face (the side not covered by the diaphragm) was uncoated, and in the other cell the back face, only, was coated with the same ruthenium oxide coating whereas the front face was uncoated.

In the first cell, that cell containing the anode coated on the front face, only, the operating cell voltage was 3.7 to 3.8 volts. In the second cell, that having the anode coated on the back face only, the operating cell voltage was 3.5 volts.

These data indicate that porous valve metal anodes having a noble metal oxide coating on the back face only operate at lower cell voltages than those having the coating on the front face.

EXAMPLE 3

In this experiment a two compartment electrolysis cell as illustrated in FIG. 1 attached was used with the exception that the anode member was a titanium flat diamond mesh coated on the front and back faces, i.e. all over, with a ruthenium oxide coating. The front face of said anode was covered with the cation-active permselective membrane as described in Example 1 above.

The cell was operated to decompose a substantially saturated sodium chloride brine solution to produce a caustic soda liquor of constant concentration at steady state conditions for thirty hours under the following conditions.

| Current Density | 2 amperes per sq. in. |
|---|---|
| Caustic Concentration | 155 gpl |
| Anolyte Temperature | 88° to 91° |
| Catholyte Temperature | 90° to 94° |
| Anolyte Salt Concentration | 292 to 309 gpl |
| Anolyte pH | 3.8 to 4.6 |
| Membrane | 7 mil thickness on Teflon cloth backing |

Under these conditions a constant voltage of 3.88 volts was observed.

Thereafter, the cell was disassembled and the ruthenium oxide coating on the front side of the anode, that side facing the cathode and which was covered with the membrane, was removed by sanding it off with the anode held in place in the anode housing.

A new 7 mil thick teflon cloth backed membrane was installed on the front or uncoated, face of the anode and the cell was reassembled. The reassembled cell was operated under the following conditions:

| Current Density | 2 ASI |
|---|---|
| Caustic Concentration | 90 to 155 gpl |
| Anolyte Temperature | 87° to 91° |
| Catholyte Temperature | 89.5 to 93.7° |
| Anolyte Salt Concentration | 290 to 305 gpl |
| Anolyte pH | 1.7 to 4.5 |

The voltage observed when the caustic concentration reached 155 gpl was 3.74 volts.

These data indicate that the voltage increase using an anode having a coating on the back face only is somewhat less (0.14 volts) than that observed under substantially similar conditions using an anode having a coating on both front and back faces.

EXAMPLE 4

In this experiment, a three compartment cell as shown in FIG. 2 was used.

The anode used was a titanium mesh anode, coated on the backside only with a ruthenium oxide coating, the front side being placed on the cation-active permselective membrane separating the anode and buffer compartments. The anode had an active screen area of 1341 in.$^2$ and a height of 36.5 in.$^2$. The cathode formed of a steel wire mesh and measured 6 by 6 inches. The buffer compartment was 5/16 in. thick.

A sodium chloride brine, containing about 300 gpl NaCl was circulated through the anode compartment. Hydrochloric acid was added to the brine to maintain the pH of the anolyte liquor between 2.6 to 3.7. The buffer and cathode compartments were filled initially with water to heights of 39 inches and 36.5 inches respectively. The cell was operated for about 48 hours. During the period of 19 to 23 hours into the run, the steady state conditions were

| Current Density | 2 ASI |
|---|---|
| Caustic Concentration in Buffer Compartment | 126–130 gpl |
| Caustic Concentration in Cathode Compartment | 260–270 gpl |
| Anolyte Temperature | 88° |
| Catholyte Temperature | 96° |
| Voltage | 4.29 volts |

During the period of from 34 to 39 hours into the run, the steady state conditions obtained were

| Current Density | 2 API |
|---|---|
| Caustic Concentration in Buffer Compartment | 110–113 gpl |
| Caustic Concentration in Cathode Compartment | 262–270 gpl |
| Anolyte Temperature | 88° |
| Catholyte Temperature | 95°–96° |
| Anolyte pH | 3.0–3.9 |
| Voltage | 4.18 volts |

This run is indicative of the benefits of the use of a three compartment cell containing a porous valve metal anode having a noble metal oxide coating on the back face thereof only said anode being emplaced on the cation-active permselective membrane member. The savings which accrue from coating only one surface or side of the porous anode are considerable and there is no substantial loss in current efficiency in the operation of the cell over extended periods.

The invention has been described in the above specification and certain preferred embodiments illustrated in the examples given above. Various modifications in the details given can be made as will be obvious to those skilled in the art without departing from the scope or spirit of the invention.

What is claimed is:

1. An electrolysis cell comprising a housing, having, in substantially vertical configuration, an anode compartment containing a porous valve metal anode, a cathode compartment containing a cathode and a cation-active permselective membrane which is substantially impervious to liquids and gases separating said anode and said cathode, said membrane being emplaced on the surface of said anode which faces the cathode, spaced apart from said cathode, said anode having a coating of a noble metal, or alloy or oxide thereof on the back face of the anode, the front face thereof not being so coated.

2. A cell as described in claim 1 wherein the cation-active permselective membrane consists essentially of a hydrolyzed copolymer of tetrafluoroethylene and a fluorosulfonated perfluorovinyl ether of the formula

$$FSO_2CF_2CF_2OCF(CF_3)CF_2OCF=CF_2$$

said copolymer having an equivalent weight of from about 900 to about 1600.

3. A cell as described in claim 2 wherein said copolymer has an equivalent weight of from about 1100 to about 1400.

4. A cell as described in claim 1 wherein said cation-active permselective membrane consists essentially of a sulfostyrenated perfluorinated ethylene propylene polymer.

5. A cell as described in claim 4 wherein said sulfostyrenated polymer is an 18 percent styrenated polymer in which about two thirds of the phenyl nuclei are monosulfonated.

6. A cell as described in claim 4 wherein the sulfostyrenated polymer is a 16 percent styrenated polymer in which about 13/16 of the phenyl nuclei are monosulfonated.

7. A cell as described in claim 1 wherein the porous valve metal anode is a porous titanium anode.

8. A cell as described in claim 7 wherein the porous titanium anode is a titanium mesh anode.

9. A cell as described in claim 8 wherein the titanium mesh anode is a diamond shaped mesh anode.

10. A cell as described in claim 9 wherein the diamond shaped mesh is an unflattened diamond shaped mesh.

11. A cell as described in claim 1 wherein the coating on the back face of said anode is a noble metal coating.

12. A cell as described in claim 1 wherein the coating on the back face of said anode is a noble metal oxide coating.

13. A cell as described in claim 12 wherein said noble metal oxide coating is a ruthenium dioxide coating.

14. A cell as described in claim 7 wherein said porous titanium anode is coated with a ruthenium oxide coating.

15. A cell as described in claim 9 wherein said titanium mesh anode is coated with a ruthenium oxide coating.

16. A cell as described in claim 1 wherein said cell contains a buffer compartment separating said cathode and said anode compartments, the walls of said buffer compartment being formed by at least two of said membranes, one being placed on said anode separating the anode compartment from the buffer compartment and the second separating the buffer compartment from the cathode compartment.

17. A chlor-alkali type diaphragm cell comprising a housing, a cation-active permselective membrane which is substantially impervious to liquids and gases disposed within said housing so as to divide said housing into a first and a second substantially vertical compartments, a cathode disposed in said first compartment spaced apart from said membrane, a porous valve metal anode having a front face and a rear face disposed in said second compartment such that said first face is in contact with said membrane, and a coating of a noble metal or alloy or oxide thereof on said rear face of said anode only.

* * * * *